US008551895B2

(12) United States Patent
Yahiaoui et al.

(10) Patent No.: US 8,551,895 B2
(45) Date of Patent: Oct. 8, 2013

(54) NONWOVEN WEBS HAVING IMPROVED BARRIER PROPERTIES (75) Inventors: Ali Yahiaoui, Roswell, GA (US); Anthony S. Spencer, Woodstock, GA (US); Linda Connor Sledge, Sandy Springs, GA (US); John Joseph Lassig, Dawsonville, GA (US); Eric Edward Lennon, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 219 days.

(21) Appl. No.: 12/976,032

(22) Filed: Dec. 22, 2010

(65) Prior Publication Data
US 2012/0164906 A1   Jun. 28, 2012

(51) Int. Cl.
*B32B 5/22* (2006.01)
*B32B 5/26* (2006.01)
*B32B 15/14* (2006.01)

(52) U.S. Cl.
USPC ............... 442/82; 442/59; 442/88; 442/92; 442/98; 442/154

(58) Field of Classification Search
USPC .................................................. 442/59–180
See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,041,203 A | 8/1977 | Brock et al. |
| 4,307,143 A | 12/1981 | Meitner |
| 4,340,563 A | 7/1982 | Appel et al. |
| 4,374,888 A | 2/1983 | Bornslaeger |
| 4,707,398 A | 11/1987 | Boggs |
| 4,766,029 A | 8/1988 | Brock et al. |
| 4,789,592 A | 12/1988 | Taniguchi et al. |
| 4,795,668 A | 1/1989 | Krueger et al. |
| 5,057,368 A | 10/1991 | Largman et al. |
| 5,069,970 A | 12/1991 | Largman et al. |
| 5,108,820 A | 4/1992 | Kaneko et al. |
| 5,108,827 A | 4/1992 | Gessner |

(Continued)

FOREIGN PATENT DOCUMENTS

EP   1557489 A   7/2005

OTHER PUBLICATIONS

Search Report and Written Opinion for PCT/IB2011/055130 dated Jun. 15, 2012, 13 pages.

*Primary Examiner* — Jennifer A Steele
(74) *Attorney, Agent, or Firm* — Dority & Manning, P.A.

(57) ABSTRACT

A laminate is generally provided having alcohol repellency properties. In one particular embodiment, the laminate includes a meltblown web bonded to a spunbond web (e.g., a SM laminate, a SMS laminate, a SMMS laminate, etc.). A fluorinated polymeric coating is attached to the surface of the spunbond web (e.g., grafted). The fluorinated polymeric coating comprises a perfluoroalkyl(alkyl) (meth)acrylate monomer polymerized on the surface of the spunbond web via exposure to a low frequency energy source. The perfluoroalkyl(alkyl) (meth)acrylate monomer has a perfluoroalkyl side groups comprising $-(CF_2)_z-F$, where z is an integer from 1 to 6. The laminate has an alcohol repellency of greater than 80%.

19 Claims, 3 Drawing Sheets

(56) References Cited

U.S. PATENT DOCUMENTS

| | | |
|---|---|---|
| 5,162,074 A | 11/1992 | Hills |
| 5,169,706 A | 12/1992 | Collier, IV et al. |
| 5,213,881 A | 5/1993 | Timmons et al. |
| 5,277,976 A | 1/1994 | Hogle et al. |
| 5,336,552 A | 8/1994 | Strack et al. |
| 5,382,400 A | 1/1995 | Pike et al. |
| 5,464,688 A | 11/1995 | Timmons et al. |
| 5,466,410 A | 11/1995 | Hills |
| 5,620,779 A | 4/1997 | Levy et al. |
| D390,708 S | 2/1998 | Brown |
| 5,962,112 A | 10/1999 | Haynes et al. |
| D428,267 S | 7/2000 | Romano, III et al. |
| 6,093,665 A | 7/2000 | Sayovitz et al. |
| 6,200,669 B1 | 3/2001 | Marmon et al. |
| 7,157,117 B2 | 1/2007 | Mikhael et al. |
| 7,805,907 B2 * | 10/2010 | Bletsos et al. ............... 52/741.3 |
| 7,811,949 B2 | 10/2010 | Snowden et al. |
| 2003/0134515 A1 | 7/2003 | David et al. |
| 2004/0002273 A1 | 1/2004 | Fitting et al. |
| 2009/0156079 A1 | 6/2009 | Yahiaoui et al. |
| 2009/0203276 A1 | 8/2009 | Kutsenko et al. |

\* cited by examiner

NONWOVEN WEBS HAVING IMPROVED BARRIER PROPERTIES

BACKGROUND OF THE INVENTION

Nonwoven fabrics are useful for a wide variety of applications, such as in wipers, towels, industrial garments, medical garments, medical drapes, sterile wraps, etc. It is not always possible, however, to produce a nonwoven fabric having all desired attributes for a given application. As a result, it is often necessary to treat nonwoven fabrics by various means to impart desired properties. For example, in some applications, barrier properties to organic solvents and oil penetration are desired.

Fabrics that can repel organic solvents can be achieved by fluorination of the material surface(s). Such fluorination has traditionally been performed by those skilled in the art via surface coating techniques of fluoropolymers having at least 8 perfluorinated carbons, and more recently, via surface grafting of fluorinated acrylic monomers bearing an end chain having at least 8 perfluorinated carbons. In particular, the conventional wisdom in the art is that liquid repellency or barrier properties to organic solvents reduces significantly with less than 8 perfluorinated carbons due to the shorter perfluorinated carbon chain making the polymer more receptive to organic solvents, as discussed in "Molecular Aggregation Structure and Surface Properties of Poly(fluoroalkyl acrylate) Thin Films", K. Honda, et al., Macromolecules, 2005, 38, p. 5699-5705. The chain length of the fluorinated acrylic monomer directly impacts its chemical repellency performance, with shorter chain lengths reducing its liquid repellency property.

However, fluorinated acrylic monomers bearing an end chain having at least 8 perfluorinated carbons, and their resulting products and polymers, have significant environmental disadvantages. In particular, these fluorinated acrylic products bearing end chains having at least 8 perfluorinated carbons ("C8") are associated with perfluorooctanoic acid (PFOA) either as a processing aid residue during manufacturing or as a potential decomposition by-product of a C8 compound.

PFOA is a synthetic chemical that does not occur naturally in the environment, but has become very persistent in the environment and found at very low levels both in the environment and in the blood of the general U.S. population. Additionally, PFOA has been found to remain in people for a very long time and has been shown to cause developmental and other adverse effects in laboratory animals. These disadvantages of PFOA are so profound that the U.S. Environmental Protection Agency (EPA), in cooperation with major companies in the industry, launched the "2010/15 PFOA Stewardship Program," in which companies committed to reduce global facility emissions and product content of PFOA and related chemicals by 95 percent by 2010, and to work toward eliminating emissions and product content by 2015.

Accordingly, there exists a need for a nonwoven fabric having suitable liquid repellency or barrier properties to organic solvents and oil penetration without the presence of fluorinated acrylic monomers bearing an end chain having at least 8 perfluorinated carbons and without the use of PFOA as a chemical in the manufacturing and without the risk of yielding PFOA by-product.

SUMMARY OF THE INVENTION

A laminate is generally provided having alcohol repellency properties. In one particular embodiment, the laminate includes a meltblown web bonded to a spunbond web (e.g., a SM laminate, a SMS laminate, a SMMS laminate, SMSFL, SMSFLS, etc.). A fluorinated polymeric coating is attached to the surface of the fibrous web (e.g., grafted). The fluorinated polymeric coating can include a perfluoroalkyl(alkyl) (meth) acrylate monomer polymerized on the surface of the fibrous web via exposure to a low frequency energy source (e.g., about 20 KHz to about 100 KHz, such as about 40 KHz), where the perfluoroalkyl(alkyl) (meth)acrylate monomer has a perfluoroalkyl side groups comprising —$(CF_2)_z$—F, where z is an integer from 1 to 6. For example, the (meth)acrylic monomers can include perfluoroalkyl(alkyl) (meth)acrylic monomers, such as those perfluoroalkyl(alkyl) (meth)acrylic monomers having the structure:

where R is H or $CH_3$; y is an integer from 0 to 22; and z is an integer from 1 to 6.

The laminate generally has an alcohol repellency of greater than 80%, such as greater than about 90% or greater than about 95%.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "fibers" refer to elongated extrudates formed by passing a polymer through a forming orifice such as a die. Unless noted otherwise, the term "fibers" includes discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. Nos. 5,336,552 to Strack et al., 5,108,820 to Kaneko, et al., 4,795,668 to Kruege, et al., 5,382,400 to Pike, et al., 5,336,552 to Strack, et al., and 6,200,669 to Marmon, et al., which are incorporated herein in their entirety by reference thereto for all purposes. Multicomponent fibers having various irregular shapes may also be formed, such as described in U.S. Pat. Nos. 5,277,976 to Hogle, et al., 5,162,074 to Hills, 5,466,410 to Hills, 5,069,970 to Largman, et al., and 5,057,368 to Largman, et al., which are incorporated herein in their entirety by reference thereto for all purposes.

As used herein, the term "multiconstituent" refers to fibers formed from at least two polymers (e.g., biconstituent fibers) that are extruded from the same extruder. The polymers are not arranged in substantially constantly positioned distinct zones across the cross-section of the fibers. Various multiconstituent fibers are described in U.S. Pat. No. 5,108,827 to Gessner, which is incorporated herein in its entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. Nos. 3,849,241 to Butin, et al.; 4,307,143 to Meitner, et al.; and 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et at, 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers. The continuous filaments may, for example, have a length much greater than their diameter, such as a length to diameter ratio ("aspect ratio") greater than about 15,000 to 1, and in some cases, greater than about 50,000 to 1.

The term "(meth)acrylic polymer" refers to both acrylic polymers and methacrylic polymers.

In the present disclosure, when a layer is being described as "on" or "over" another layer, it is to be understood that the layers can either be directly contacting each other or have another layer or feature positioned therebetween. Thus, these terms are simply describing the relative position of the layers to each other and do not necessarily mean "on top of" since the relative position above or below depends upon the orientation of the device to the viewer.

Test Methods

Alcohol Repellency: The alcohol repellency test is designed to measure the resistance of nonwoven fabrics to penetration by low surface tension liquids, such as alcohol/water solutions. Alcohol repellency was tested according to the test procedure described as follows. In this test, a fabric's resistance to penetration by low surface energy fluids is determined by placing 0.1 nil of a specified volume percentage of isopropyl alcohol (IPA) solution in several different locations on the surface of the fabric and leaving the specimen undisturbed for 5 minutes. In this test, 0.1 ml of serially diluted isopropyl alcohol and distilled water solutions, ranging from 60 volume percent to 100 volume percent in increments of 10 percent, are placed on a fabric sample arranged on a flat surface. After 5 minutes, the surface is visually inspected and the highest concentration retained by the fabric sample is noted. For example, if the minimum value is a 70% IPA solution, i.e. a 70% IPA solution is retained by the fabric but an 80% solution penetrates through the fabric to the underlying surface. The grading scale ranges from 0 to 5, with 0 indicating the IPA solution wets the fabric and 5 indicating maximum repellency. Unless stated otherwise, the percent alcohol (IPA) repellency reported indicates the maximum volume percent of IPA that could be added to water while still retaining a 5 rating on the scale at all points of the fabric tested. This procedure is a modification of INDA Standard Test No. IST 80.9-74 (R-82).

ASTM-F903-10 Method C—Standard for Resistance of Material used in Protective Clothing. It is desirable to have a material that passes the list of solvents defined in ASTM F-903 using methods C (without pressure).

The so-called Gutter Test, EN 6530-2005, is another test method for resistance of a material to penetration of liquids.

Oil repellency is measured by a method according to the AATCC-118-1981. Solvents of different surface tension are placed on the sample and the sample is scored according to the solvent of lowest surface tension that does not penetrate the sample. A treated fabric that is not penetrated by Nujol™ (Plough Inc., cas number 8042-47-5), having the lowest penetrating power, is rated as score 1, and a treated fabric that is not penetrated by heptane, having the highest penetrating power in test oils, is rated as score 8. (See also, U.S. Pat. No. 5,132,028 for a description of this procedure, which is incorporated by reference herein).

DETAILED DESCRIPTION

Generally speaking, the present invention is directed to a multi-layered nonwoven laminate that contains a meltblown web and spunbond web and has a fluorinated polymeric coating over at least one surface (e.g., over an exposed surface of the spunbond web). The fluorinated polymeric coating can provide sufficient barrier resistance to organic solvents (e.g., alcohols). In one embodiment, for example, the laminate contains a meltblown web positioned between two spunbond webs to form a spunbond/meltblown/spunbond ("SMS") laminate, as described in greater detail below.

For example, the nonwoven web having a fluorinated polymeric coating over at least one surface can have an alcohol repellency of greater than 80%, such as greater than about 90%, such as greater than about 95%. Additionally, in some embodiments, the nonwoven web can pass the ASTM-F903-10, Method C, for solvent repellency without pressure for other chemicals, such as acetonitrile, dimethylformamide, methanol, carbon disulfide, nitrobenzene, sulfuric acid 98%, sulfuric acid 30%, sodium hydroxide 50%, and/or sodium hydroxide 10%. The nonwoven webs can also be rated according to pass the Gutter test method and have a class rating of at least Class 1, preferably at least Class 3.

In particular embodiments, the nonwoven web having a fluorinated polymeric coating can have an oil repellency rating of at least 1, such as 7 to 8 or higher.

I. Fluorinated Polymeric Coating

According to the present invention, the fluorinated polymeric coating contains a polymerized (meth)acrylate monomer having a perfluoroalkyl side group of 1 to 6 carbons on the surface of the laminate to graft the polymeric coating thereto. For example, the fluorinated polymeric coating can have a (meth)acrylic polymer backbone from which a plurality of perfluoroalkyl side groups of 1 to 6 carbons extend, either directly or indirectly through an alkyl group (e.g., having 1 to 4 carbons). In one particular embodiment, the perfluoroalkyl side groups have a length of 6 carbon atoms extending from the (meth)acrylic polymer backbone.

Surprisingly, it has been unexpectedly discovered that a nonwoven web having a fluorinated polymeric coating including the perfluoroalkyl(alkyl) (meth)acrylate polymer with perfluoroalkyl side groups defined by 1 to 6 carbon atoms (and, in particular embodiments, by 2, 4, or 6 carbon atoms) can be formed to have substantially identical barrier properties to organic solvents (e.g., isopropyl alcohol) than an otherwise identical nonwoven web but having a fluorinated polymeric coating including perfluoroalkyl side groups defined by 8 carbon atoms. Thus, a nonwoven web has been discovered that can achieve the desired repellency properties without the use and/or presence of a PFOA anywhere in the manufacturing process.

The perfluoroalkyl side groups having 1 to 6 carbon atoms can be shown structurally in Formula 1:

—(CF$_2$)$_z$—F.  (Formula 1A)

where z is 1 to 6. In particular embodiments, z can be 2, 4, or 6, and these perfluoroalkyl side groups can be referred to as C2, C4, and C6, respectively, referencing the number of perfluorinated carbons in the chain. It should be noted that the perfluoroalkyl side group of Formula 1A (and the other Formulas of the present disclosure) can be more commonly shown according to Formula 1B, which is intended to be the same structure as Formula 1A:

—(CF$_2$)$_{z'}$—CF$_3$  (Formula 1B)

where z' is 0 to 5 (e.g., 1, 3, or 5). Formula 1A is simply shown with the terminal fluorinated carbon (—CF$_3$) as part of the perfluoroalkyl chain (i.e., as —CF$_2$—F) such that the value of z of Formula 1A corresponds to the total number of carbons in the perfluoroalkyl chain.

As stated, the perfluoroalkyl side groups can be bonded to the (meth)acrylic polymer backbone directly or indirectly. In one particular embodiment, the perfluoroalkyl side groups can be bonded through an alkyl group of 1 to 22 carbons, such as shown in Formula 2 below. However, other linking moieties can indirectly link the perfluoroalkyl side groups and the polymer backbone as discussed below.

Suitable perfluoroalkyl(alkyl) (meth)acrylic monomers include perfluoroalkyl(alkyl) (meth)acrylate esters having a perfluorinated carbon end group with 1 to 6 carbon atoms. For example, the perfluoroalkyl(alkyl) (meth)acrylic monomers can have the structure shown in Formula 2:

Formula 2 where R is H or CH$_3$; y is an integer from 0 to 22 (e.g., 2 to 12); and z is an integer from 1 to 6 (e.g., 2, 4, or 6). In particular embodiments, y is 2 to 4 (e.g., 2) and/or z is 6.

In alternative embodiments, the ester linkage between the perfluoroalkyl group and the double bond (as shown in Formula 2) can be an amide, a sulfonamide, an ether, an imide, a urethane, a saturated or unsaturated 6 membered ring structure (e.g., styrenic or phenilic groups), or other suitable moieties.

Monomers of this type may be readily synthesized by one of skill in the chemical arts by applying well-known techniques. Additionally, many of these materials are commercially available. For example, fluoroacrylate monomers under the trade names Capstone® 62-AC and Capstone® 62-MA (DuPont Corporation of Wilmington, Del.) and Unidyne® TG 20 and Unidyne® TG 30 (Daikin Americas, Inc. of Orangeburg, N.Y.) may be used in the practice of the present invention.

In one particular embodiment, the perfluoroalkyl(alkyl) (meth)acrylate polymer is a homopolymer (i.e., containing only a single type of perfluoroalkyl(alkyl) (meth)acrylate monomer). Alternatively, the perfluoroalkyl(alkyl) (meth) acrylate polymer can be a copolymer formed through a mixture of perfluoroalkyl(alkyl) (meth)acrylate monomers corresponding to different values of y and/or z within the ranges given below with respect to Formula 2. As such, in these embodiments, perfluoroalkyl(alkyl) (meth)acrylate polymer can be substantially free from monomers outside of the Formula 2 (i.e., the perfluoroalkyl(alkyl) (meth)acrylate polymer includes greater than about 99% by weight perfluoroalkyl (alkyl) (meth)acrylate monomers according to Formula 2).

However, in other embodiments, the perfluoroalkyl(alkyl) (meth)acrylate polymer can be a copolymer formed from a perfluoroalkyl(alkyl) (meth)acrylate monomer(s), as in Formula 2, combined with other types of monomers (e.g., other (meth)acrylic monomers).

It should be also recognized that the fluorinated polymeric coating may be highly branched and grafted (e.g., covalently bonded) to the fibers (e.g., crosslinked to the polymeric material of the fibers) upon polymerization.

II. Polymerization on the Nonwoven Web

In one particular embodiment, the perfluoroalkyl(alkyl) (meth)acrylate polymer can be formed on the nonwoven web by deposition and subsequent grafting of suitable perfluoroalkyl(alkyl) (meth)acrylic monomers to the web via irradiation from a high energy source (e.g., plasma, gamma, and UV rays and electron beam). The monomer deposition process generally involves (1) pretreatment exposure to a first high energy source, (2) atomization or evaporation of the monomers in a vacuum chamber, (3) condensation of the monomers on the nonwoven laminate (e.g., a cooled laminate), and (4) polymerization of the monomers by exposure to a second high energy source (e.g., plasma, electron beam, gamma radiation, or ultraviolet radiation).

No matter the particular perfluoroalkyl(alkyl) (meth) acrylic monomer used, the perfluoroalkyl(alkyl) (meth) acrylic monomer is evaporated (or atomized) and condensed (or sprayed) on the porous substrate according to a monomer deposition process. A high energy source (e.g., a low frequency (LF) plasma) can then initiate graft polymerization of the monomer onto the surfaces of the web, including within pores and other void space between the fibers, that can be reached by the activated monomer chemistry. The level of liquid repellency achieved by plasma polymerization of the laminate may depend, in part, upon the amount of perfluoroalkyl(alkyl) (meth)acrylic monomer that has been deposited (e.g., condensed) and graft copolymerized on the surface of the laminate. Various references are available which describe, in detail, plasma fluorination processes. For example, US 20030134515 and EP 1 557 489 disclose plasma fluorination processes.

While a variety of plasma fluorination processes are available, one particularly suitable plasma fluorination processes used to treat the laminate for repellency to oils is through generating plasma in a vacuum chamber using low frequency (LF) plasma. A gas or vapor, such as, for example, containing perfluoroalkyl(alkyl) (meth)acrylic monomer, is flash-evaporated into the chamber and allowed to condense on the surface of the web. The LF plasma then initiates the graft polymerization of the monomer onto the surfaces of the laminate via exposure to the LF plasma. The LF plasma can have a frequency of about 20 KHz to about 100 KHz, such as about 30 KHz to about 50 KHz. In one particular embodiment, the LF plasma can have a frequency of about 40 KHz.

Other methods for graft polymerization can also be used, such as described by Mikhael, et al. in U.S. Pat. No. 7,157, 117, which is incorporated by reference to the extend that it does not conflict with the present application. In this monomer deposition process, a conventional vacuum chamber is used to enable a plasma-field pretreatment, followed by monomer deposition, and then high energy curing of the monomer on a porous substrate (e.g., the surface of a nonwoven web) in a continuous process. Typically, the nonwoven web or nonwoven laminate is processed entirely within a vacuum chamber while being spooled continuously between a feed reel and a product reel. Optionally, the web or laminate can first be passed over a cold surface (e.g., a chill roll) to cool the material to a temperature sufficiently low to ensure the subsequent cryocondensation of the vaporized perfluoroalkyl (alkyl) (meth)acrylic monomers. The web or laminate is initially passed through a plasma pretreatment unit (e.g., an LF plasma) and can immediately thereafter (within no more than a few seconds, preferably within milliseconds) pass through a flash evaporator, where it is exposed to the perfluoroalkyl (alkyl) (meth)acrylic monomer vapor for the deposition of a thin liquid film over the web or laminate. The perfluoroalkyl (alkyl) (meth)acrylic monomer film is then polymerized by high energy curing through exposure to an electron beam unit and/or an LF plasma system (or vice-versa) and optionally passed downstream through another high energy curing process (e.g., LF plasma) to insure complete curing.

Thus, the nonwoven laminate is, in one particular embodiment, subjected to a particular combination of high-energy treatments to impart the alcohol and oil repellency to the web. First, the nonwoven web is subjected to a high-energy treatment such as a glow discharge (GD) from a plasma treatment system. Following the high energy pretreatment, the monomer is deposited (e.g., through condensation) onto the nonwoven web and may then be subjected to another high energy source, as discussed above, for graft polymerization of the fluorinated monomer on the surface of the fibers of the nonwoven web.

The high energy pre-treatment seemingly serves to "clean" the nonwoven laminated from "loose" weak boundary layers made of contaminants. The high energy treatment can also generate radicals on the surface of the laminate, which can subsequently enhance surface attachment through covalent bonding of the polymerizing fluorinated monomer(s) being exposed to the high energy source. By way of example, the high energy treatment may be a radio frequency (RF) plasma treatment system, such as operating at about 13.56 MHz. Alternatively, the high energy treatment may be a low frequency (LF) plasma treatment system, such as operating at about 40 KHz or lower. Alternatively, a microwave plasma treatment system can be used, such as operating at about 2.45 GHz. Without wishing to be bound by theory, it is believed that exposure of the porous hydrophobic polymer substrate to a high energy treatment results in alterations of the surfaces of the laminate, thereby activating the substrate and forming transient radicals that can promote rapid and efficient initiation of the fluorinated monomer system (or monomer compounds). These functions are attributed to the plasma ablation of contaminants, the removal of atoms, and the breaking of bonds that can generate free radicals and ionic species. This, in turn, allows the subsequent uniform fluorination of the porous substrate; that is, the porous substrate may be saturated with the fluorinated moieties on its surface and through its porous structure.

The strength of the high energy treatment may be varied in a controlled manner across at least one dimension of the fibrous web. For example, the strength of the high energy treatment can be readily varied in a controlled manner by known means.

It has been surprisingly found that the processing conditions used to form the fluorinated polymeric coating on the nonwoven web affect the liquid barrier properties of the resulting web. In particular, the polymerization technique and conditions for forming the perfluoroalkyl(alkyl) (meth)acrylate polymer with perfluoroalkyl side groups having a length from 1 to 6 carbons has surprising been found to allow the resulting polymer to exhibit repellency properties for organic solvents (e.g., alcohol) that were previously thought unachievable except through the use of (meth)acrylate polymers having perfluoroalkyl side groups with a length of 8 carbons or more. Accordingly, the present inventors have surprisingly found that the web coated with the perfluoroalkyl(alkyl) (meth)acrylate polymer having perfluoroalkyl side groups that are from 1 to 6 carbons in length can exhibit an alcohol repellency of greater than about 80% (using the alcohol repellency test explained above, an alcohol repellency of 80% means a that a 80% solution of IPA scores a 5), such as greater than about 90%, and greater than about 95%. In one particular embodiment, the web can exhibit an alcohol repellency of about 100%, indicating that the web or laminate exhibits maximum repellency (i.e., a score of 5 on the scale of 0-5) for a 100% solution of IPA.

In particular, it has been found that specific control of various processing variables (e.g., the monomer composition, the localized pressures within the treatment chamber where the substrate is present and the monomer is delivered, the atmosphere within the treatment chamber (e.g., an inert atmosphere), the power input, dwell time, etc.) can result in a nonwoven web having alcohol repellency properties substantially equivalent to those of a (meth)acrylic polymer having a perfluoroalkyl side chain with a length of 8 carbons or more. The strength of the high energy treatment may be varied in a controlled manner across at least one dimension of the fibrous web. For example, the strength of the high energy treatment can be readily varied in a controlled manner by known means. However, the power level and/or frequency may be adjusted according to a function of the pressure within deposition chamber. For example, the deposition pressure within the chamber can be about 50 mTorr to about 500 mTorr (e.g., about 120 mTorr to about 400 mTorr, such as about 140 mTorr to about 350 mTorr) at a power of about 1 to about 20 KW (e.g., about 5 KW to about 15 KW) and a frequency of about 10 KHz to about 50 KHz (e.g., about 35 KHz to about 45 KHz). In selected embodiments, the reaction time may vary from about 1 milliseconds to about 60 seconds or longer if necessary, depending on the size of the reactor and the dimensions of the roll inside the plasma reactor, the power level and frequency of the high energy treatment, etc. Other fluorinated compounds and/or fluorine precursors and/or other hydrocarbon co-monomers may also be used in the plasma treatment process.

The amount and thickness of the fluorinated polymeric coating on the surface of the laminate can be controlled by adjusting the deposition rate and/or speed of the web traveling through the deposition area. In one particular embodiment, the fluorinated polymeric coating is applied to the surface of the laminate in an add-on amount of about 0.01% to about 1% by weight. The thickness of the fluorinated coating can be about 10 nm to about 1000 nm. Higher add-on levels or thicker coatings are also possible by adjusting flow rate, power input and line speed.

It has been surprisingly found that the processing conditions used to form the fluorinated polymeric coating on the nonwoven web affect the liquid barrier properties of the resulting web. In particular, the polymerization technique and conditions for forming the perfluoroalkyl(alkyl) (meth)acrylate polymer with perfluoroalkyl side groups having a length from 1 to 6 carbons has surprising been found to allow the resulting polymer to exhibit repellency properties for organic solvents (e.g., alcohol) that were previously thought unachievable except through the use of (meth)acrylate polymers having perfluoroalkyl side groups with a length of 8 carbons or more. Accordingly, the present inventors have surprisingly found that the web coated with the perfluoroalkyl(alkyl) (meth)acrylate polymer having perfluoroalkyl side groups that are from 1 to 6 carbons in length can exhibit an alcohol repellency of greater than about 80% (using the alcohol repellency test explained above, an alcohol repellency of 80% means a that a 80% solution of IPA scores a 5), such as greater than about 90%, and greater than about 95%. In one particular embodiment, the web can exhibit an alcohol repellency of about 100%, indicating that the web or laminate exhibits maximum repellency (i.e., a score of 5 on the scale of 0-5) for a 100% solution of IPA.

In particular, it has been found that specific control of various processing variables (e.g., the monomer composition, the localized pressures within the treatment chamber where the substrate is present and the monomer is delivered, the atmosphere within the treatment chamber (e.g., an inert atmosphere), the power input, dwell time, etc.) can result in a nonwoven web having a alcohol repellency properties substantially equivalent to those of a (meth)acrylic polymer having a perfluoroalkyl side chain with a length of 8 carbons or more.

As such, in one particular embodiment, the monomers can be deposited onto the surface of the nonwoven web without a crosslinker, catalyst, or other polymerizing agent. For example, the monomers can be deposited onto the surface as a neat monomer composition that is substantially free from any additional components (i.e., consisting of the perfluoroalkyl(alkyl) (meth)acrylic monomers).

In alternative embodiments, the monomers can be deposited with a co-monomer (e.g., other acrylic monomers) and/or crosslinker and/or combinations thereof. Such a co-monomer can be present, in certain embodiments, in a weight ratio of about 1:5 to about 1:25 of co-monomer to perfluoroalkyl (alkyl) (meth)acrylic monomer (e.g., about 1:10 to about 1:20).

For example, the co-monomers can also be fluorinated acrylic monomers, such as a diacrylic fluoroalkyls. One particularly suitable diacrylic fluoroalkyl has the structure:

Formula 3 where n is an integer 2 to 12, such as about 4 to about 6. For instance, the diacrylic fluoroalkyl can be a perfluoro-hexanediol diacrylate (i.e., n is 4), such as available under the Unidyne S-2045 from (Daikin Americas, Inc. of Orangeburg, N.Y.) or C6DIACRY from ExFluor Research Corporation (Round Rock, Tex.).

Additionally, the flash and/or deposition atmosphere (i.e., the atmosphere within the treatment chamber) can be substantially free of oxygen, and in one embodiment, can be inert (e.g., containing an inert gas such as argon). For example, it may not be desirable to have oxygen present during the plasma grafting process, even if results may be acceptable from repellency standpoint, due to degradation of the monomer by the oxygen which may yield objectionable degradation by products.

III. Nonwoven Webs

As stated, the nonwoven laminate having the fluorinated polymeric coating over at least one surface contains a meltblown layer and spunbond layer. The fluorinated polymeric coating is generally applied to an outer surface of the nonwoven laminate to maximize the barrier properties it provides.

In one embodiment, for example, the laminate contains a meltblown web positioned between two spunbond webs to form a spunbond/meltblown/spunbond ("SMS") laminate. In another embodiment one of the layers of the laminate can be a thermoplastic film layer.

Figure 1:
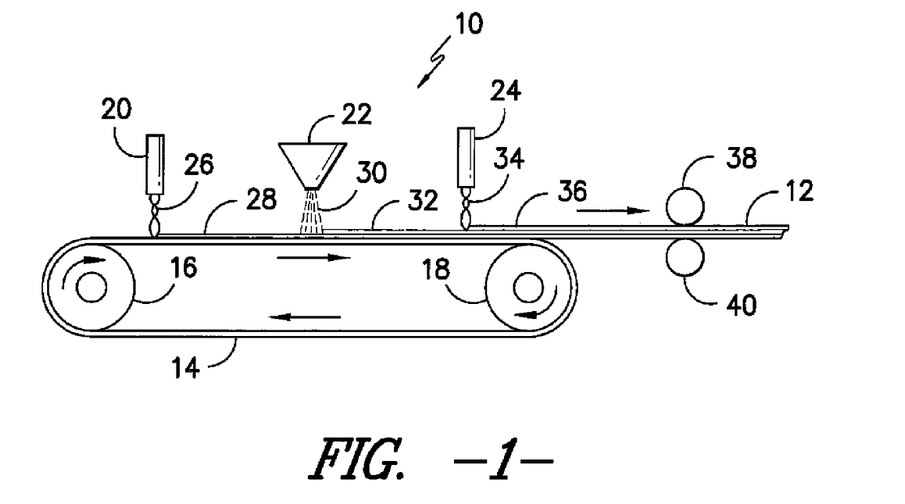
FIG. 1 is a schematic illustration of a process that may be used in one embodiment of the present invention to form a nonwoven laminate.

Referring to FIG. 1, one embodiment of a forming machine 10 is shown for producing an exemplary SMS laminate 12 having a meltblown layer 32 positioned between spunbond layers 28 and 36. The forming machine 10 includes an endless foraminous surface 14 (e.g., belt) wrapped around rollers 16 and 18 so that the surface 14 is driven in the direction shown by the arrows. In this embodiment, the illustrated forming machine 10 employs a first spunbond station 20, a meltblown station 22, and a second spunbond station 24. Alternatively, one or more of the laminate layers may be formed separately, rolled, and later converted to the laminate 12.

The spunbond stations 20 and 24 may each employ one or more conventional extruders. The extrusion temperature may generally vary depending on the type of polymers employed. The molten thermoplastic material which includes the antistatic treatment additive is fed from the extruders through respective polymer conduits to a spinneret (not shown). Spinnerets are well known to those of skill in the art. A quench blower (not shown) may be positioned adjacent the curtain of filaments extending from the spinneret. Air from the quench air blower quenches the filaments extending from the spinneret. The quench air may be directed from one side of the filament curtain or both sides of the filament curtain. Such a process generally reduces the temperature of the extruded polymers at least about 100° C. over a relatively short time frame (seconds). This will generally reduce the temperature change needed upon cooling, to preferably be less than 150° C. and, in some cases, less than 100° C. The ability to use relatively low extruder temperature also allows for the use of lower quenching temperatures. For example, the quench blower may employ one or more zones operating at a temperature of from about 20° C. to about 100° C., and in some embodiments, from about 25° C. to about 60° C.

After quenching, the filaments are drawn into the vertical passage of the fiber draw unit by a flow of a gas such as air, from a heater or blower through the fiber draw unit. The flow of gas causes the filaments to draw or attenuate which increases the molecular orientation or crystallinity of the polymers forming the filaments. Fiber draw units or aspirators for use in melt spinning polymers are well known in the art. Suitable fiber draw units for use in the process of the present invention include a linear fiber aspirator of the type shown in U.S. Pat. No. 3,802,817, which is incorporated herein in its entirety by reference thereto for all relevant purposes. Thereafter, the filaments 26 are deposited through the outlet opening of the fiber draw unit and onto the foraminous surface 14 to form the spunbond layers 28.

Referring again to FIG. 1, the meltblown station 22 includes a single die tip, although other meltblown die tips may of course be employed. As the polymer exits the die, high pressure fluid (e.g., heated air) attenuates and spreads the polymer stream into microfibers 30. The microfibers 30 are randomly deposited onto the spunbond layer 28 to form the meltblown layer 32. The distance between the die tip and the foraminous surface 14 is generally small to improve the uniformity of the fiber laydown. For example, the distance may be from about 1 to about 6 centimeters. After the meltblown layer 32 is deposited, the spunbond station 24 deposits spunbond filaments 34 onto the meltblown layer 32 as described above to produce the spunbond layer 36.

Once formed, the nonwoven laminate is then bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the aliphatic polyester(s) used to form the fibers. Suitable autogenous bonding techniques may include ultrasonic bonding, thermal bonding, through-air bonding, and so forth.

In FIG. 1, for instance, the SMS laminate passes through a nip formed between a pair of rolls 38 and 40, one or both of which are heated to melt-fuse the fibers, One or both of the rolls 38 and 40 may also contain intermittently raised bond points to provide an intermittent bonding pattern. The pattern of the raised points is generally selected so that the nonwoven laminate has a total bond area of less than about 50% (as determined by conventional optical microscopic methods), and in some embodiments, less than about 30%. Likewise, the bond density is also typically greater than about 100 bonds per square inch, and in some embodiments, from about 250 to about 500 pin bonds per square inch. Such a combination of total bond area and bond density may be achieved by bonding the web with a pin bond pattern having more than about 100 pin bonds per square inch that provides a total bond surface area less than about 30% when fully contacting a smooth anvil roll. In some embodiments, the bond pattern may have a pin bond density from about 250 to about 350 pin bonds per square inch and a total bond surface area from about 10% to about 25% when contacting a smooth anvil roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., U.S. Design Pat. No. 428,267 to Romano et al. and U.S. Design Pat. No. 390,708 to Brown, which are incorporated herein in their entirety by reference thereto for all purposes.

Figure 2:
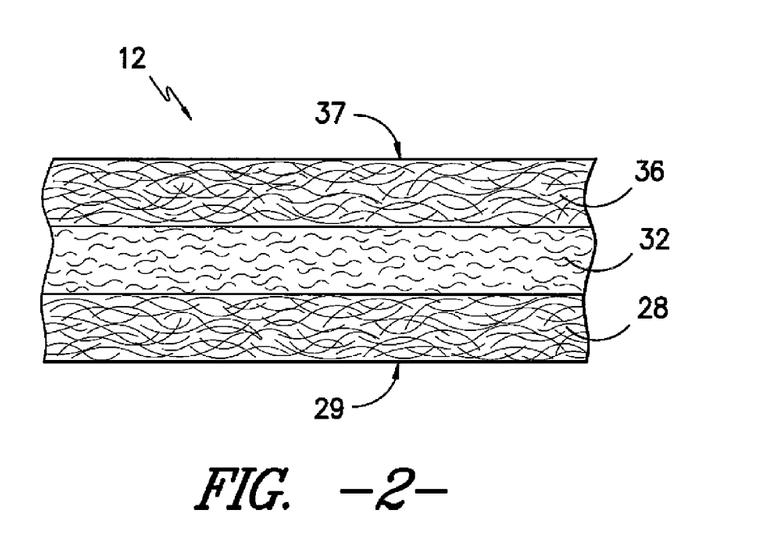
FIG. 2 shows an exemplary SMS laminate for use according to one embodiment of the present invention.

One embodiment of the SMS laminate 12 formed according to the process shown in FIG. 1 is shown in greater detail in FIG. 2. As illustrated, the meltblown layer 32 is positioned between two spunbond layers 28 and 36.

Figure 3:
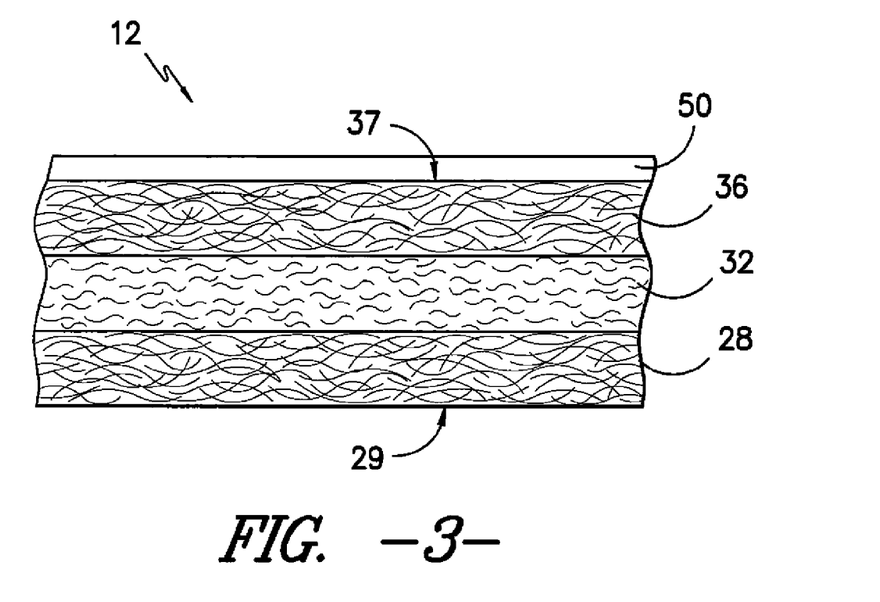
FIG. 3 shows an embodiment of an SMS laminate as in FIG. 2 after formation of a fluorinated polymeric coating on one surface.
Figure 4:
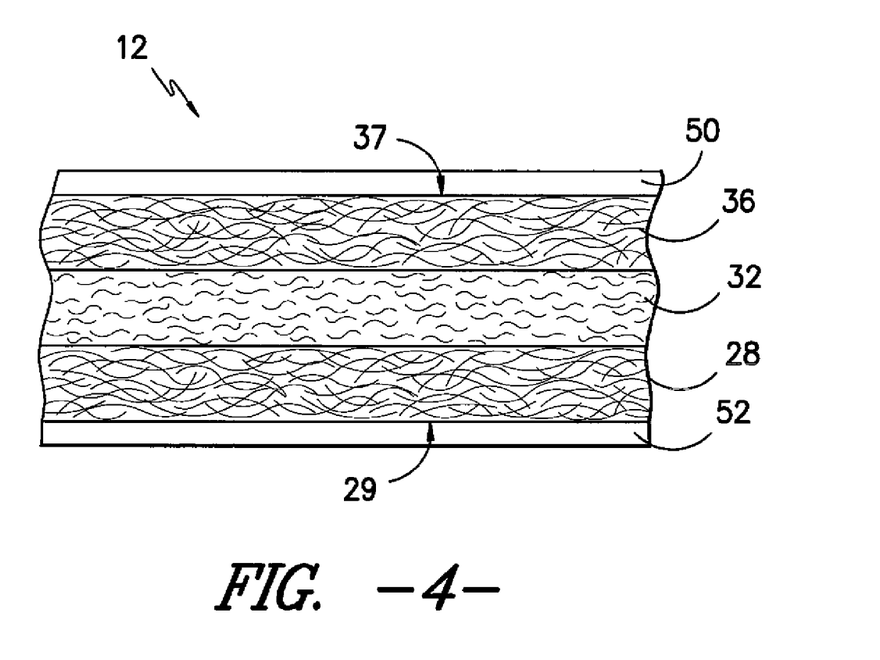
FIG. 4 shows another embodiment of an SMS laminate having a first fluorinated polymeric coating one surface and a second fluorinated polymeric coating on the opposite surface.

FIG. 3 shows an embodiment of an SMS laminate 12 after formation of the fluorinated polymeric coating 50, as discussed above, on the surface 37 of the spunbond layer 36. FIG. 4 shows another embodiment of an SMS laminate 12 having a first fluorinated polymeric coating 50 on the first surface 37 of the spunbond layer 36, and a second fluorinated polymeric coating 52 on the surface 29 of the spunbond layer 28.

In one particular embodiment, the nonwoven webs are constructed from synthetic, polymeric. For example, the thermoplastic polymeric material used to form the nonwoven web can generally be hydrophobic. In addition, the fibers of the nonwoven web are primarily hydrophobic synthetic fibers. For example, greater than about 90% of the fibers of the web can be hydrophobic synthetic fibers, such as greater than about 95%. In one embodiment, substantially all of the fibers of the nonwoven web (i.e., greater than about 98%, greater than about 99%, or about 100%) are hydrophobic synthetic fibers.

Exemplary synthetic polymers for use in forming nonwoven web may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven web. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Various methods for forming multicomponent fibers are described in U.S. Pat. No. 4,789,592 to Taniguchi et al. and U.S. Pat. Nos. 5,336,552 to Strack, et al., 5,108,820 to Kaneko, et al., 4,795,668 to Kruege, et al., 5,382,400 to Pike, et al., 5,336,552 to Strack, et al., and 6,200,669 to Marmon, et al., which are incorporated herein in their entirety by reference thereto for all purposes. Multicomponent fibers having various irregular shapes may also be formed, such as described in U.S. Pat. Nos. 5,277,976 to Hogle, et al., 5,162,074 to Hills, 5,466,410 to Hills, 5,069,970 to Largman, et al., and 5,057,368 to Largman, et al., which are incorporated herein in their entirety by reference thereto for all purposes.

Although any combination of polymers may be used, the polymers of the multicomponent fibers are typically made from thermoplastic materials with different glass transition or melting temperatures where a first component (e.g., sheath) melts at a temperature lower than a second component (e.g., core). Softening or melting of the first polymer component of the multicomponent fiber allows the multicomponent fibers to form a tacky skeletal structure, which upon cooling, stabilizes the fibrous structure. For example, the multicomponent fibers may have from about 5% to about 80%, and in some embodiments, from about 10% to about 60% by weight of the low melting polymer. Further, the multicomponent fibers may have from about 95% to about 20%, and in some embodiments, from about 90% to about 40%, by weight of the high melting polymer. Some examples of known sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del.

Sheath/core bicomponent fibers where the sheath is a polyolefin such as polyethylene or polypropylene and the core is polyester such as poly(ethylene terephthalate) or poly(butylene terephthalate) can also be used to produce the nonwoven fabrics. The primary role of the polyester core is to provide resiliency and thus to maintain or recover bulk under/after load.

Suitable multi-layered materials may include, for instance, spunbond/meltblown/spunbond (SMS) laminates and spunbond/meltblown (SM) laminates. Various examples of suitable SMS laminates are described in U.S. Pat. Nos. 4,041,203 to Brock et al.; 5,213,881 to Timmons, at al.; 5,464,688 to Timmons, et al.; 4,374,888 to Bornslaeger; 5,169,706 to Collier, et al.; and 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

In one particular embodiment, the fluorinated polymeric coating is applied to a spunbond web or a laminate having an outer surface defined by a spunbond web (e.g., an SMS laminate). Although the spunbond web can be made by conventional processes, in some cases it may be either desirable or necessary to stabilize the nonwoven fabric by known means, such as thermal point bonding, through-air bonding, and hydroentangling.

As stated, the spunbond web can primarily include synthetic fibers, particularly synthetic hydrophobic fibers, such as polyolefin fibers. In one particular embodiment, polypropylene fibers can be used to form the nonwoven web. The polypropylene fibers may have a denier per filament of about 1.5 to 2.5, and the nonwoven web may have a basis weight of about 17 grams per square meter (0.5 ounce per square yard). In one particular embodiment, the spunbond web can be added to other layers to form a nonwoven laminate. For example, the nonwoven laminate can contain a meltblown layer and spunbond layer. The techniques used to form the nonwoven laminate generally depend on the desired configuration. In one embodiment, for example, the nonwoven laminate contains a meltblown layer positioned between two spunbond layers to form a spunbond/meltblown/spunbond ("SMS") laminate. Various techniques for forming SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc.

If desired, the nonwoven laminate of the present invention may be applied with various other treatments to impart desirable characteristics. For example, the laminate may be treated with surfactants, colorants, UV stabilizers, antifogging agents, lubricants, and/or antimicrobial agents. In one particular embodiment, an antistatic agent can be included within the fibers of the web, as disclosed in U.S. Publication No. 2009/0156079 of Yahiaoui, et al., the disclosure of which is incorporated herein by reference.

In one particular embodiment, the nonwoven web can be precoated with a thin metalized layer prior to formation of the fluorinated polymeric coating to achieve superior surface resistivity. This metalized layer is generally thin enough to allow for the subsequently deposited perfluoroalkyl(alkyl) (meth)acrylic monomers to still graft (or otherwise covalently bond) to the polymers on the surface of the laminate upon polymerization, as discussed above. As such, the metalized layer can have a thickness of about 1 nanometer (nm) to about 1 micrometer (μm), such as about 10 nm to about 250 nm.

The metalized layer can include gold, silver, aluminum, chromium, copper, iron, zirconium, platinum, nickel, titanium, oxides of these metals, or combinations thereof. In one embodiment, the metalized layer can be applied to the surface of the laminate while still hot, to ensure adherence of the metals to the laminate, although any suitable method of forming the metalized layer on the laminate may be utilized.

Figure 5:
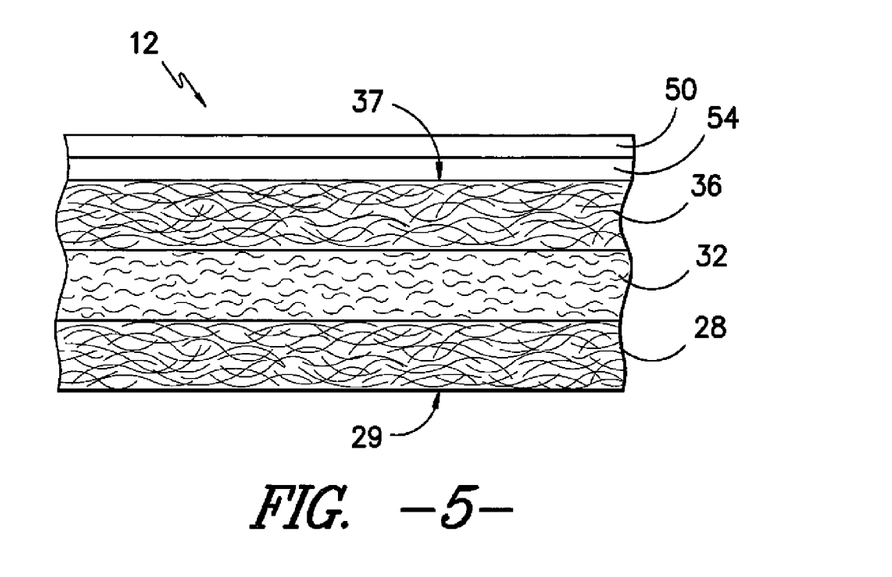
FIG. 5 shows yet another embodiment of an SMS laminate having a metalized layer between its surface and the fluorinated polymeric coating.
Figure 6:
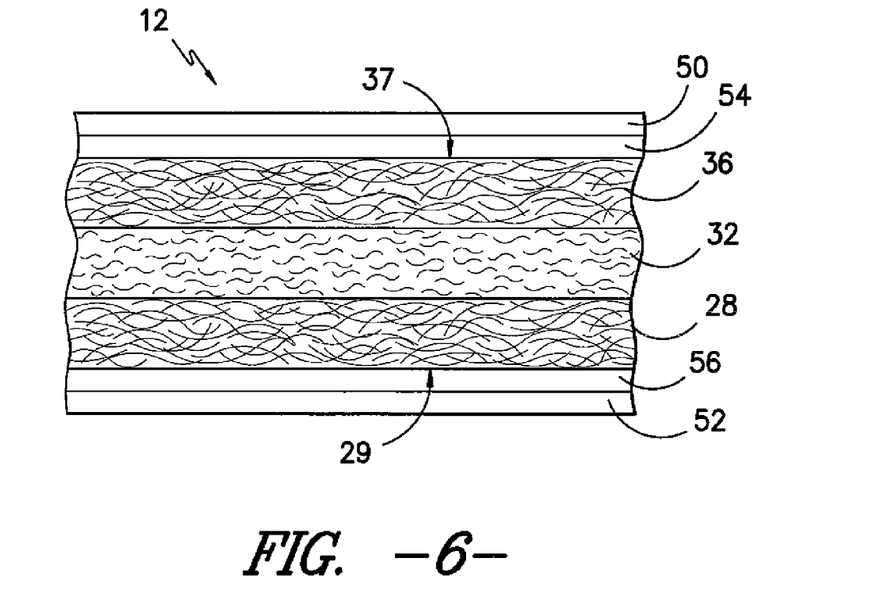
FIG. 6 shows yet another embodiment of an SMS laminate having a first metalized layer between the one surface and a first fluorinated polymeric coating and a second metalized layer between the opposite surface and the second fluorinated polymeric coating.

For example, FIG. 5 shows an alternative embodiment of the laminate 12 shown in FIG. 3 in that a metalized layer 54 is between the spunbond layer 36 and the fluorinated polymeric coating 50. Similarly, FIG. 6 shows an alternative embodiment of the laminate 12 shown in FIG. 4 in that a first metalized layer 54 is between the spunbond layer 36 and the fluorinated polymeric coating 50, and a second metalized layer 56 is between the spunbond layer 28 and the fluorinated polymeric coating 52.

The nonwoven laminate of the present invention may be used in a wide variety of applications. For example, the laminate may be incorporated into a "medical product", such as gowns, surgical drapes, facemasks, head coverings, surgical caps, shoe coverings, sterilization wraps, warming blankets, heating pads, and so forth. Of course, the nonwoven laminate may also be used in various other articles. For example, the nonwoven laminate may be incorporated into protective articles. Examples of some protective articles include, but are not limited to, personal care articles, such as gowns, coveralls, shoe covers, head gear, face masks, drapes, or within components of absorbent articles such as diapers, training pants, absorbent underpants, incontinence articles, feminine hygiene products (e.g., sanitary napkins), swim wear, and so forth; medical absorbent articles, such as garments, fenestration materials, underpads, bedpads, and bandages; clothing articles; pouches, and so forth. In one embodiment, the nonwoven laminate can be used, for example, in products configured for outdoor use, such as tents, car covers, clothing, etc. to provide protection from the natural elements. In another embodiment, the nonwoven laminate can be used for filter media applications that can be resistant to penetration by oils and other chemicals. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, the nonwoven laminate of the present invention may be used to form an outer cover of an absorbent article.

Although the basis weight of the nonwoven laminate of the present invention may be tailored to the desired application, it generally ranges from about 10 to about 300 grams per square meter ("gsm"), in some embodiments from about 25 to about 200 gsm, and in some embodiments, from about 40 to about 150 gsm.

The present invention may be better understood with reference to the following examples.

Example 1

An SMS laminate (Kimberly-Clark, Inc.) was treated with a fluorinated acrylate monomer under the conditions shown in Table 1 to result in a fluorinated laminate with the results shown:

TABLE 1

| | Pre-Treatment | | | FC Treatment | | | | | | | | Process | | |
|---|---|---|---|---|---|---|---|---|---|---|---|---|---|---|
| Sample No. | Roll Width (in) | Plasma Power (KW) | Plasma Gas Flow Type | FC Monomer | Co-monomer (XC) | FC:XC Ratio | Monomer Flow rate (ml/hr) | Web Speed (fpm) | Duration of Step (min.) | E-beam (V) | E-beam Gas | P (mtorr) | Drum Temp (° C.) | IPA (%) |
| 1A | 36 | 2.49 | 100 sccm, 80:20 Ar/O$_2$ | Unidyne Tg-20 | Sartomer SR-238B | 90:10 | 50 | 100 | 0.01 | 3 | 345 sccm Ar | 50 | −14 | <70 |
| 1B | 36 | 2.49 | 100 sccm, 80:20 Ar/O$_2$ | Unidyne Tg-20 | Sartomer SR-238B | 90:10 | 65 | 100 | 0.01 | 3 | 255 sccm Ar | 85 | −14 | 70 |
| 2 | 36 | 2.49 | 80:20 Ar/O$_2$ at 100 sccm bubble into Unidyne Tg-20 | Unidyne Tg-20 | Sartomer SR-238B | 90:10 | 65 | 100 | 0.01 | 3.1 | 250 sccm Ar | 64 | −18 | 70-80 |
| 3A | 36 | 2.49 | 100 sccm, 80:20 Ar/O$_2$ | Unidyne Tg-20 | Sartomer SR-238B | 90:10 | 75 | 100 | 0.01 | 2.77 | 265 sccm Ar | 72 | −14 | 80-90 |
| 3B | 36 | 2.49 | 100 sccm, SF6 | Unidyne Tg-20 | Sartomer SR-238B | 90:10 | 65 | 100 | 0.01 | 3.06 | 268 sccm Ar | 81 | −14 | 70-80 |

TABLE 1-continued

| | | Pre-Treatment | | FC Treatment | | | | | | | | Process | | |
|---|---|---|---|---|---|---|---|---|---|---|---|---|---|---|
| Sample No. | Roll Width (in) | Plasma Power (KW) | Plasma Gas Flow Type | FC Monomer | Co-monomer (XC) | FC:XC Ratio | Monomer Flow rate (ml/hr) | Web Speed (fpm) | Duration of Step (min.) | E-beam (V) | E-beam Gas | P (mtorr) | Drum Temp (° C.) | IPA (%) |
| 3C | 36 | 2.49 | 100 sccm, 80:20 Ar/$O_2$ | Unidyne Tg-20 | Sartomer SR-238B + Unidyne S-2045 (Florinated HDODA) | 85:5:10 | 65 | 100 | 0.01 | 3 | 266 sccm Ar | 84 | −14 | 80-90 |
| 4A | 36 | 2.5 | 110 sccm, 80:200 Ar/$O_2$ | Unidyne Tg-20 | Sartomer SR-238B | 90:10 | 85 | 100 | 0.01 | 2.89 | 278 sccm Ar | 76 | −14 | 90-100 |
| 4B | 36 | 2.5 | 110 sccm, 80:200 Ar/$O_2$ | Unidyne Tg-20 | Sartomer SR-238B | 90:10 | 75 | 100 | 0.01 | 3.76 | 278 sccm Ar | 110 | −14 | 80-100 |
| 5A | 45 | 3.2 | 80:20 Ar/$O_2$ | Unidyne Tg-20 | N/A | 100% | 65 | 125 | 0.008 | 2.56 | 163 sccm Ar | 64 | −14 | 100 |
| 5B | 45 | 3.2 | 80:20 Ar/$O_2$ | Unidyne Tg-20 | N/A | 100% | 65 | 200 | 0.005 | 3.03 | 163 sccm Ar | 66 | −14 | 100 |
| 5C | 45 | 2.5 | 80:20 Ar/O2 | Unidyne Tg-20 | N/A | 100% | 65 | 125 | 0.008 | 3.8 | 163 sccm Ar | 78 | −14 | 100 |
| 6A | 45 | 3.2 | 80:20 Ar/$O_2$ | Unidyne Tg-30 | N/A | 100% | 65 | 125 | 0.008 | 2.19 | 155 sccm Ar | 68 | −14 | 100 |
| 6B | 45 | 3.2 | 80:20 Ar/$O_2$ | Unidyne Tg-30 | N/A | 100% | 65 | 200 | 0.005 | 3.03 | 155 sccm Ar | 85 | −14 | 100 |
| 6C | 45 | 2.5 | 80:20 Ar/$O_2$ | Unidyne Tg-30 | N/A | 100% | 65 | 125 | 0.008 | 3.8 | 155 sccm Ar | 72 | −14 | 100 |
| 7A | 45 | 3.2 | 80:20 Ar/$O_2$ | Unidyne Tg-30 | N/A | 100% | 65 | 200 | 0.005 | 2.29 | 155 sccm Ar | 63 | −14 | 100 |
| 7B | 45 | 3.2 | 80:20 Ar/$O_2$ | Unidyne Tg-30 | N/A | 100% | 65 | 250 | 0.004 | 2.44 | 155 sccm Ar | 63 | −14 | 100 |
| 7C | 45 | 2.5 | 80:20 Ar/$O_2$ | Unidyne Tg-30 | N/A | 100% | 65 | 300 | 0.003 | 2.91 | 155 sccm Ar | 56 | −14 | 100 |
| 8A | 45 | 3.2 | 80:20 Ar/$O_2$ | Unidyne Tg-20 | N/A | 100% | 65 | 200 | 0.005 | 2.77 | 163 sccm Ar | 60 | −14 | 100 |
| 8B | 45 | 3.2 | 80:20 Ar/$O_2$ | Unidyne Tg-20 | N/A | 100% | 65 | 250 | 0.004 | 2.98 | 163 sccm Ar | 56 | −14 | 100 |
| 8C | 45 | 2.5 | 80:20 Ar/$O_2$ | Unidyne Tg-20 | N/A | 100% | 65 | 300 | 0.003 | 3.14 | 163 sccm Ar | 63 | −14 | 80 |

Example 2

An SMS laminate (Kimberly-Clark, Inc.) was treated with a fluorinated acrylate monomer under the conditions shown in Table 2 to result in a fluorinated laminate with the results shown:

TABLE 2

| | | Plasma | | | | | | | Process Drum | | | | |
| | | | | | | | | | Drum Roll | | | | |
| | Nozzle | | DPT$_a$ | DPT$_a$ Gas Flow | DPT$_b$ | DPT$_b$ Gas Flow | Monomer | | E-beam | Glycol Inlet Valve (On/Off)// | Chill Roll Glycol Inlet Valve | Vacuum | IPA (%) |
| No. | Width (in.) | DPT$_a$ (KW) | Gas Type | Rate (sccm) | DPT$_b$ (KW) | Gas Type | Rate (sccm) | Type (M$_B$) | M$_b$ (ml/min) | E-beam$_b$ (KV) | Temp (F.) (Set = 5 F.) | (On/Off)// Temp (F.) | P (mTorr) | Front | Back |
|---|---|---|---|---|---|---|---|---|---|---|---|---|---|---|---|
| 9 | 64 | 8 | Ar | 500 | 8 | Ar | 500 | 100% Tg-20 | 80 | 3.25 | On//5 | Off//68 | 56 | 165 | <40 | NR |
| 10 | 64 | 7.5 | Ar | 500 | 7.5 | Ar | 500 | 100% Tg-20 | 80 | Turned Off | On//5 | Off//68 | 165 | 165 | 100 | NR |
| 11 | 64 | 7.5 | Ar | 500 | 7.5 | Ar | 500 | 100% Tg-20 | 80 | | On//5 | Off//68 | 220 | 165 | 70 | NR |
| 12 | 30 | 7.5 | Ar | 500 | 7.5 | Ar | 500 | 100% Tg-20 | 40 | | On//5 | Off//68 | 70 | 165 | 90 | 90 |
| 13 | 30 | 7.5 | Ar | 500 | 7.5 | Ar | 500 | 100% Tg-20 | 40 | | On//5 | Off//68 | 170 | 165 | 100 | 100 |
| 14 | 30 | 7.5 | Ar | 500 | 7.5 | Ar | 500 | 100% Tg-20 | 40 | | On//6.4 | Off//68 | 155 | 165 | 100 | 100 |
| 15 | 30 | 7.5 | Ar | 500 | 7.5 | Ar | 500 | 100% Tg-20 | 40 | | On//6.4 | Off//68 | 225 | 250 | 100 | NR |
| 16 | 30 | 7.5 | Ar | 500 | 7.5 | Ar | 500 | 100% Tg-20 | 40 | Turned Off | On//3.6 | Off//68 | 235 | 165 | 100 | 100 |
| 17 | 64 | 7.5 | Ar | 500 | 7.5 | Ar | 500 | 100% Tg-20 | 41 | | On//5.0 | Off//68 | 240 | 165 | 100 | 100 |
| 18 | 64 | 7.5 | Ar | 500 | 7.5 | Ar | 500 | 100% Tg-20 | 41 | | On//6.1 | Off//68 | 320 | 165 | 100 | 100 |
| 19 | 64 | 7.5 | Ar | 500 | 7.5 | Ar | 500 | 100% Tg-20 | 80 | | On//5.0 | Off//68 | 195 | 165 | 100 | 100 |
| 20 | 64 | 7.5 | Ar | 500 | 7.5 | Ar | 500 | 100% Tg-20 | 60 | | On//5.4 | Off//68 | 175 | 165 | 100 | 100 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A laminate having alcohol repellency properties, the laminate comprising:
   a meltblown web;
   a spunbond web bonded to the meltblown web, wherein the spunbond web defines a surface; and
   a fluorinated polymeric coating attached to the surface of the spunbond web,
   wherein the fluorinated polymeric coating comprises a perfluoroalkyl(alkyl) (meth)acrylate monomer polymerized with a comonomer on the surface of the spunbond web via exposure to a low frequency energy source, wherein the perfluoroalkyl(alkyl) (meth)acrylate monomer has a perfluoroalkyl side groups comprising —(CF$_2$)$_z$—F, where z is an integer from 1 to 6, and wherein the comonomer comprises a diacrylic fluoroalkyl monomer;
   wherein the laminate has an alcohol repellency of greater than 80%.

2. The laminate as in claim 1, wherein the low frequency energy source has a frequency of about 20 KHz to about 100 KHz.

3. The laminate as in claim 1, wherein the low frequency energy source has a frequency of about 40 KHz.

4. The laminate as in claim 1, wherein the laminate has an alcohol repellency of greater than 90%.

5. The laminate as in claim 1, wherein the perfluoroalkyl (alkyl) (meth)acrylate monomer comprises:

where R is H or CH$_3$; y is an integer from 1 to 12; and z is an integer from 1 to 6.

6. The laminate as in claim 5, wherein y is 2 to 6.

7. The laminate as in claim 5, wherein y is 2.

8. The laminate as in claim 5, wherein z is 2, 4, or 6.

9. The laminate as in claim 5, wherein z is 6.

10. The laminate as in claim 1, further comprising:
    a metalized layer between the spunbond web and the fluorinated polymeric coating.

11. The laminate as in claim 1, wherein the diacrylic fluoroalkyl monomer has the structure:

where n is an integer 2 to 12.

12. A laminate having alcohol repellency properties, the laminate comprising:
a first spunbond web;
a second spunbond web;
a meltblown web between the first spunbond web and the second spunbond web, wherein the first spunbond web, the meltblown web, and the second spunbond web are bonded together to form the laminate such that the first spunbond web defines a first surface and the second spunbond web defines a second surface;
a metalized layer on the first surface of the first spunbond web; and
a fluorinated polymeric coating attached to the metalized layer such that the metalized layer is between the first spunbond web and the fluorinated polymeric coating, wherein the fluorinated polymeric coating comprises a perfluoroalkyl(alkyl) (meth)acrylate monomer polymerized on the surface of the spunbond web via exposure to a low frequency energy source, wherein the perfluoroalkyl(alkyl) (meth)acrylate monomer has a perfluoroalkyl side groups comprising $-(CF_2)_z-F$, where z is an integer from 1 to 6, wherein the fluorinated polymeric coating further comprises a comonomer, the comonomer comprising a diacrylic fluoroalkyl monomer;
wherein the laminate has an alcohol repellency of greater than 80%.

13. The laminate as in claim 12, wherein the low frequency energy source has a frequency of about 20 KHz to about 100 KHz.

14. The laminate as in claim 12, wherein the laminate has an alcohol repellency of greater than 90%.

15. The laminate as in claim 12, wherein the perfluoroalkyl (alkyl) (meth)acrylic monomers comprise:

where R is H or $CH_3$; y is an integer from 1 to 12; and z is an integer from 1 to 6.

16. The laminate as in claim 15, wherein z is 6.

17. The laminate as in claim 12, wherein the metalized layer comprises aluminum.

18. A laminate having alcohol repellency properties, the laminate comprising:
a first spunbond web;
a second spunbond web;
a meltblown web between the first spunbond web and the second spunbond web, wherein the first spunbond web, the meltblown web, and the second spunbond web are bonded together to form the laminate such that the first spunbond web defines a first surface and the second spunbond web defines a second surface;
a metalized layer on the first surface of the first spunbond web; and a fluorinated polymeric coating attached to the metalized layer such that the metalized layer is between the first spunbond web and the fluorinated polymeric coating, wherein the fluorinated polymeric coating comprises a perfluoroalkyl(alkyl) (meth)acrylate monomer polymerized on the surface of the spunbond web via exposure to a low frequency energy source, wherein the perfluoroalkyl(alkyl) (meth)acrylate monomer has a perfluoroalkyl side groups comprising $-(CF_2)-F$, where z is an integer from 1 to 6 wherein the fluorinated polymeric coating further comprises a comonomer having the structure:

where n is an integer 2 to 12;
wherein the laminate has an alcohol repellency of greater than 80%.

19. The laminate as in claim 10, wherein the metalized layer comprises aluminum.

* * * * *